(12) United States Patent
Shen et al.

(10) Patent No.: US 8,959,507 B2
(45) Date of Patent: Feb. 17, 2015

(54) BOOKMARKS AND PERFORMANCE HISTORY FOR NETWORK SOFTWARE DEPLOYMENT EVALUATION

(75) Inventors: Ge Shen, Shanghai (CN); Shoufu Gao, Sammamish, WA (US); Leyu Feng, Shanghai (CN); Yang Liu, Shanghai (CN); Zhenxing Yang, Shanghai (CN); Ning Hu, Shanghai (CN)

(73) Assignee: Microsoft Corporation, Redmond, WA (US)

( * ) Notice: Subject to any disclaimer, the term of this patent is extended or adjusted under 35 U.S.C. 154(b) by 788 days.

(21) Appl. No.: 12/791,894

(22) Filed: Jun. 2, 2010

(65) Prior Publication Data

US 2011/0302576 A1    Dec. 8, 2011

(51) Int. Cl.
G06F 9/445 (2006.01)
H04L 12/24 (2006.01)
H04L 29/08 (2006.01)

(52) U.S. Cl.
CPC .............. *H04L 41/069* (2013.01); *G06F 8/61* (2013.01); *H04L 67/34* (2013.01)
USPC ........... 717/177; 717/172; 717/174; 717/175; 717/176; 717/178

(58) Field of Classification Search
None
See application file for complete search history.

(56) References Cited

U.S. PATENT DOCUMENTS

| 6,100,890 | A | * | 8/2000 | Bates et al. | 715/826 |
|---|---|---|---|---|---|
| 7,111,053 | B1 | * | 9/2006 | Black et al. | 709/220 |
| 7,216,343 | B2 | * | 5/2007 | Das et al. | 717/168 |
| 7,284,232 | B1 | * | 10/2007 | Bates et al. | 717/100 |
| 2003/0005082 | A1 | * | 1/2003 | Shah et al. | 709/218 |
| 2004/0236774 | A1 | * | 11/2004 | Baird et al. | 707/100 |
| 2005/0198247 | A1 | * | 9/2005 | Perry et al. | 709/223 |
| 2006/0020866 | A1 | * | 1/2006 | Lo et al. | 714/741 |
| 2006/0075112 | A1 | * | 4/2006 | Polozoff | 709/227 |
| 2006/0161879 | A1 | * | 7/2006 | Lubrecht et al. | 717/101 |
| 2006/0184926 | A1 | * | 8/2006 | Or et al. | 717/168 |

(Continued)

FOREIGN PATENT DOCUMENTS

WO    2009007967 A2    1/2009

OTHER PUBLICATIONS

"Automated Server Deployment Benefits and Practices", Retrieved at << http://eval.symantec.com/mktginfo/enterprise/white_papers/b-whitepaper_auto_server_deploy_10-2006_en.us.pdf >>, Oct. 16, 2006, pp. 16.

"CA Software Change Manager", Retrieved at << http://ca.com/files/ProductBriefs/software-change-mgr-product-brief-us.pdf >>, 2008, pp. 14.

(Continued)

*Primary Examiner* — Henry Tsai
*Assistant Examiner* — Jing-Yih Shyu
(74) *Attorney, Agent, or Firm* — Kate Drakos; Micky Minhas (57) ABSTRACT

Described are automatically generated software deployment bookmarks that maintain information regarding events and/or triggers with respect to a network software deployment operation. The bookmarks are accessible and useable for evaluating the progress and state of the deployment. For example, a bookmark may be generated when deployment to a client machine succeeds, when a software deployment package is created and/or distributed, and for network component and/or membership state changes. A set of bookmarks may be used to generate a curve indicative of the deployment progress over time, and may be compared to previous progress of deploying other network software to client computer systems that is based on maintained performance history data.

20 Claims, 7 Drawing Sheets

(56) References Cited

U.S. PATENT DOCUMENTS

| | | |
|---|---|---|
| 2006/0248522 A1* | 11/2006 | Lakshminarayanan et al. .................... 717/174 |
| 2008/0178148 A1* | 7/2008 | Enyeart et al. ................ 717/109 |
| 2009/0019438 A1* | 1/2009 | Madduri et al. ............. 718/100 |
| 2009/0228579 A1* | 9/2009 | Sanghvi et al. ............... 709/224 |
| 2010/0017385 A1* | 1/2010 | Wilcox et al. .................... 707/5 |
| 2010/0281456 A1* | 11/2010 | Eizenman et al. ............ 717/104 |
| 2011/0055193 A1* | 3/2011 | Lauridsen et al. ........... 707/707 |

OTHER PUBLICATIONS

"Numara Deployment Manager", Retrieved at << http://www.numarasoftware.com/asset_management/resources/pdf/Numara_Asset_Management_Platform_DeploymentManager_Brochure.pdf >>, 2009, pp. 3.

"Seamless Application Management", Retrieved at << http://www.stratussoft.com/products/StratusSoftDataSheet.pdf >>, Retrieved Date: Feb. 2, 2010, pp. 2.

* cited by examiner

BOOKMARKS AND PERFORMANCE HISTORY FOR NETWORK SOFTWARE DEPLOYMENT EVALUATION

BACKGROUND

Information technology (IT) administrators need to monitor the deployment of software, including programs and patches, with respect to the deployment's state and progress. This includes checking whether a given deployment is on track or out of control, and/or is proceeding efficiently or not. In general, this is accomplished by the administrator analyzing the status messages reported by client machines, and is based upon the administrator's experience.

In a large enterprise, typically there are many computing machines, of various types, including desktops, laptops and mobile devices. Each of these machines typically reports to a central configuration server (e.g., a System Center Configuration Manager, or SCCM server) or the like through log streams (e.g. status messages or status events). As a result, in order to determine the progress of deployment and/or the significant events that occurred or are occurring with respect to that deployment, the administrator needs to manually analyze a substantial amount of raw data.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which network components and/or user interface interaction automatically generate bookmarks that maintain information regarding events and/or triggers with respect to a network software deployment operation. The bookmarks are maintained in a data store, and are accessible and useable for evaluating the progress and state of the network software deployment operation as well as for use in troubleshooting and diagnosing various issues.

Examples of bookmarks that may be generated include a bookmark corresponding to when a software deployment package is created, a bookmark corresponding to when a software deployment package is distributed to a distribution point, a bookmark corresponding to when a distribution policy is generated or changed, and/or a bookmark corresponding to an object change that affects deployment task status. Other examples include a bookmark corresponding to when a network component starts, stops or restarts, a bookmark corresponding to when membership of a collection of network members changes, a bookmark corresponding to when a network component is added, removed, updated or refreshed, and/or a bookmark corresponding to information regarding a maintenance task.

In one aspect, the set the bookmarks, which each record data regarding a network software deployment operation, may be accessed and used to generate a visual representation (e.g., a curve) indicative of progress over time of deploying network software to client computer systems. Performance history data related to one or more previous network software deployment operations may be accessed and used to generate a visual representation indicative of previous progress of deploying other network software to client computer systems.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards automatically recording network software deployment-related (e.g., events and trigger) information, in data referred to as bookmarks, throughout a network software deployment operation. In general, the bookmarks record and save the significant events and/or triggered information that affect the deployment, and bind the events with the time that they happened. Via the bookmarks, an administrator is able to evaluate (e.g., monitor and check) what happened and/or is happening in the deployment process, and thereby efficiently find any deployment-related issues, as well as help troubleshoot those issues.

Another aspect is related to performance history, which in general collects the raw data as the history of a deployment, and automatically generates performance reports and/or graphs via data aggregation and calculation. The automatic collection and analysis of the history helps an administrator to easily and efficiently evaluate a deployment progress, including the deployment progress relative to previous, similar deployments.

It should be understood that any of the examples herein are non-limiting. Indeed, an architecture is described as one example of how the various aspects of bookmarks and performance data history may be implemented, but this is only one suitable example architecture, and bookmarks and/or performance data history are not limited to any particular implementation/architecture. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and networking in general.

Figure 1:
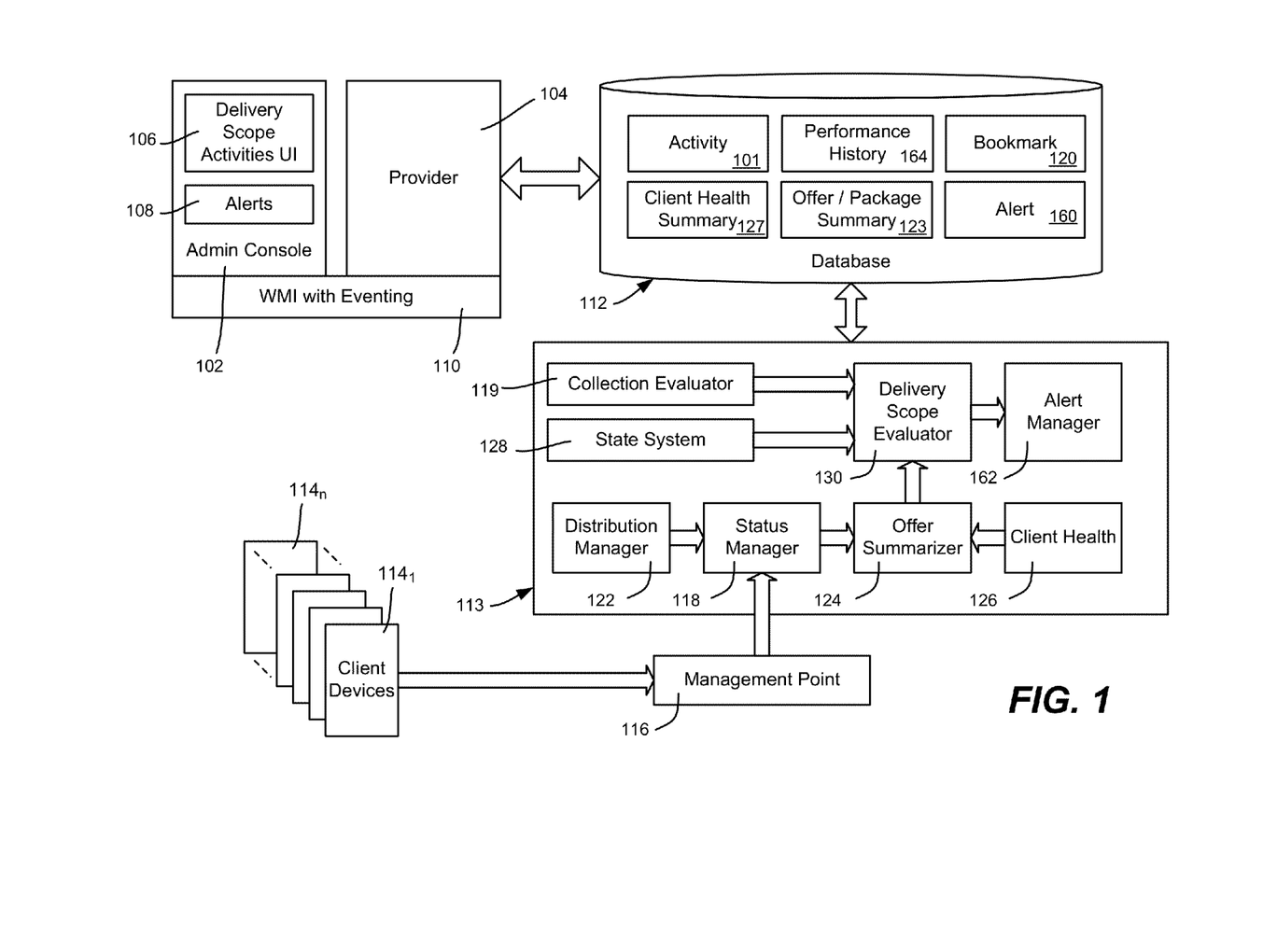
FIG. 1 is a block diagram representing an example architecture for generating and collecting bookmarks and performance history data with respect to a network software deployment operation.
Figure 2:
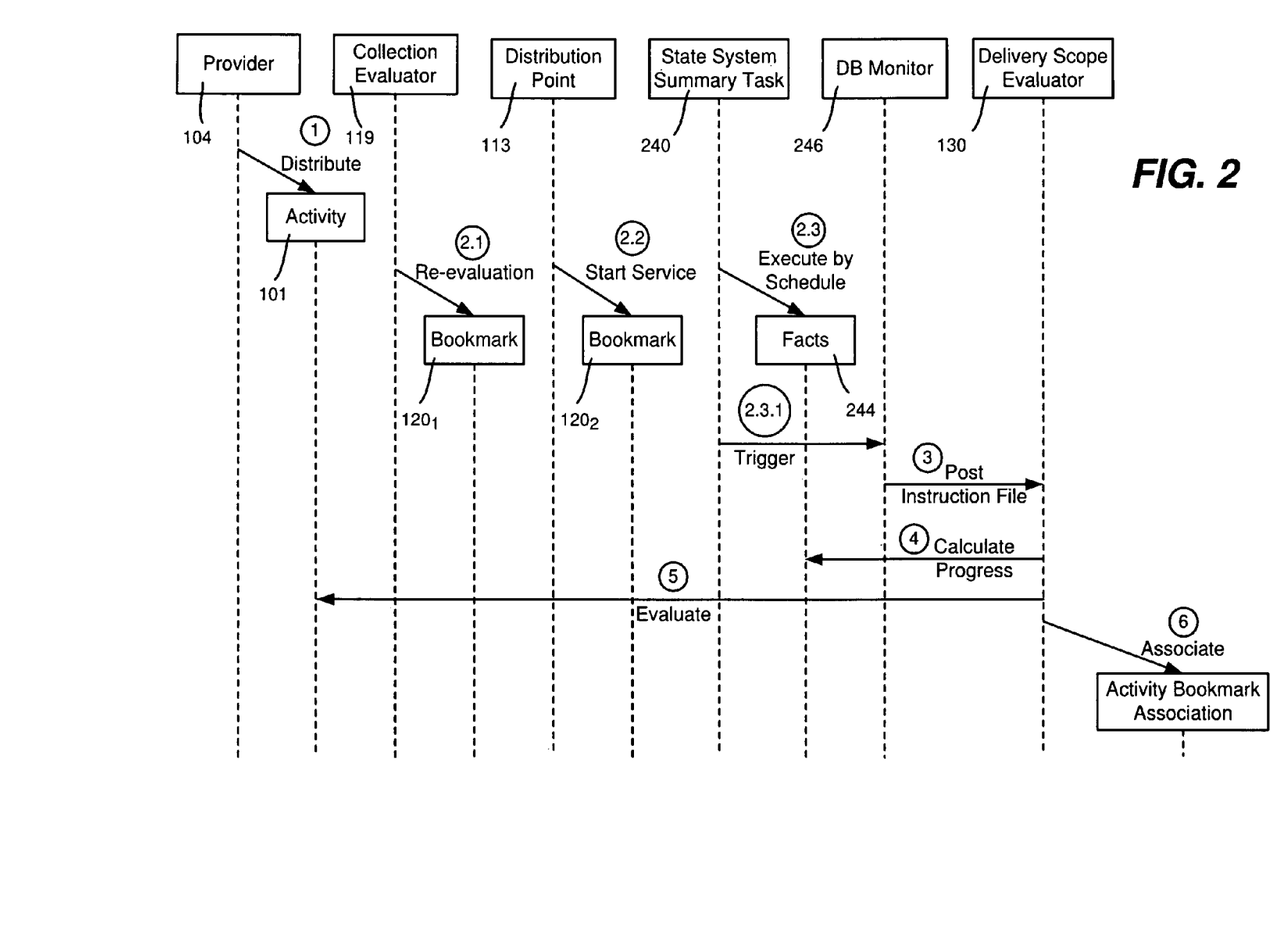
FIG. 2 is a flow diagram representing network components related to a network software deployment operation, including bookmark generation.

FIG. 1 shows a general example architecture into which bookmark and deployment performance data operations may be implemented; FIG. 2 represents a general ordering of operations related to bookmarks. In general, an administrator creates a software deployment package comprising program software or a patch for distribution. When this occurs, an activity 101 for distribution (e.g., corresponding to a deployment specified on an administrator console 102) may be generated by a provider 104, as generally represented via the circled numeral one (1) in FIG. 2. For example, the administrator console 102 may include a user interface 106 to specify the distribution task, as well as view alerts 108; the console may be coupled to the provider 104 via Windows Management Instrumentation (WMI) technology 110. The activity 101 is maintained in a suitable data store, such as a database 112.

An activity generally corresponds to information of a distribution task, including package, advertisement of the package to clients, and deployment information. Various factors related to distribution may include package size, number of distribution points, whether the deployment is mandatory or optional, and whether the deployment is scheduled or not (as well as scheduled in UTC time or local time). Other information may specify whether the deployment is to run from a distribution point or from the local machine, and retry behavior.

Each activity is an instance that maintains an association with the actual distribution task instance, as well as maintaining a historical summary of a distribution task's progress in a consistent manner for various types of distribution tasks. An activity also may be used to associate the administrator's expectation with a checkpoint of the progress, and evaluate the on-track or late status, and/or healthy or unhealthy status with the checkpoint. An activity also may track the progress of each step of the distribution process, as long as the status message provides information about which step resulted in the message.

Once created, the software deployment package is then distributed to a distribution point 113, which is typically a file share server used for client machines $114_1$-$114_n$ to get the package. The management point 116 generates new policy (e.g., an offer or advertisement) that describes the related information, such as to inform the clients that the new software package is ready, and thus may alternatively be referred to as (or work with) a policy provider, which may be implemented as a systems management server (SMS) executive. At some point thereafter, the client machines $114_1$-$114_n$ connect to the management point 116 to obtain the policy and know that there is a new patch/software program package update available for installation.

After retrieving the information from the policy, each client machine (e.g., $114_1$) connects to get the deployed software for installation. Each client machine sends a status message to a status manager 118 of the distribution point 113 to report the results, namely success or failure.

In general, a bookmark operation adds a bookmark 120 (e.g., a record in the database 112) to save the information for every significant step, such as when the package is created, when the package is distributed to the distribution point 113, when the policy is generated, when the components start, stop or restart, the success or failure, and so forth. Whenever an administrator changes an object (e.g., a package, advertisement, software update deployment) via the UI 106, and the change affects the deployment task status, an appropriate bookmark will be logged via the provider 104.

By way of example, consider that the administrator creates a package and attempts deployment to ten-thousand machines, and finds that thirty-five percent failed. After checking the bookmarks, the administrator may determine that the package was successfully created, and distributed to seven distribution point servers, with failure reported on three of the distribution point servers. The administrator may then check and fix the failed distribution point servers and redistribute the software to these three servers. The client machines coupled to those distribution point servers may then load and install the software at a later appropriate time.

Other components represented in FIGS. 1 and 2 include a collection evaluator 119, which in general updates collection members (systems/network components that are involved in a deployment) by a schedule or by a UI trigger. Note that systems are regularly added to a network, while others become unhealthy, and so forth. The collection evaluator 119 adds a bookmark (e.g., $120_1$, FIG. 2) into the database 112 for such member-related updates. Note that the policy provider obtains collection member change information and when there is a change, updates the policy for every member, as this affects deployment; the policy provider also adds a corresponding bookmark into the database 112. Thus, status changes of site components and the provider are logged as a bookmark. For a site component, only a general message may be logged (e.g., component online/offline). APIs may be implemented for other components to implement bookmark features.

Thus, one of the steps that results in a bookmark being recorded include content distribution, from a site server to the distribution points. Others include the policy distribution of the target policy to the clients, retrieval of the policy by a client from the site server, starting the service/content download from the distribution points to a client, and installation/execution of the program on a client. With some or all of these bookmarks, and possibly others, a checkpoint model may be built, e.g., to determine whether a deployment is on track or late with respect to the final execution result for policy distribution, and/or with respect to the final copy result for content distribution.

The distribution manager 122 copies a package source to a distribution point, and updates and refreshes the distribution point. Its status affects package activity status.

The offer summarizer 124 is an existing component (e.g., thread) that captures distribution status messages in order to accumulate a real time summary 123, e.g., for maintaining in the database 112. The offer summarizer 124 also captures distribution status messages to populate details as to the per client, per advertisement statuses into the database 112. The offer summarizer 124 may integrate client health data 126 with the real time summary, e.g., by periodically synchronizing the real time summary with the state system summary; the client health summary 127 may be maintained in the database 112. The healthy or unhealthy state of deployment may be based on the error messages received during the distribution.

The state system 128 is an existing component (e.g., thread) that parses, replicates and executes state messages, as well as executes scheduled summary tasks (e.g., 240, FIG. 2). Facts 244 about the tasks may be generated. Note that advertisement and deployment summary data are updated by summary tasks running in state system 128. The state system 128 may work with new package distribution summary tasks, integrate the client health data with the summary, and maintain a history of the summary.

The administrator may set one or more checkpoints, e.g., to set one or more expected execution success ratios and/or dates for on-track/late evaluation. The administrator may also set an error message threshold. The delivery scope evaluator 130 is a thread component that may be triggered by a summarization task in the state system. In general, the delivery scope evaluator 130 evaluates the distribution status from the summary against the checkpoints, associates bookmarks with activities, and raise notifications of distribution status changes. There may be an evaluation as to when new facts 244 have been copied, and/or to raise a warning or error when the latest actual progress is beyond a baseline.

A database notification monitor 246 (FIG. 2) triggers the distribution manager 122 to handle the changes that results when a package is added/updated or a distribution point is added/updated to a package. The database notification monitor 246 can also run maintenance tasks.

Also shown for completeness in FIG. 1 are alerts 160, such as managed by an alert manager 162, and performance history data 164. Performance history data 164 may be used as described below with reference to FIG. 6, e.g., as part of an automatically generated graph.

A bookmark library may be provided that enables other components to generate a bookmark. For example, a "GenerateBookmark( . . . )" function call or the like may be provided for this purpose.

Figure 3:
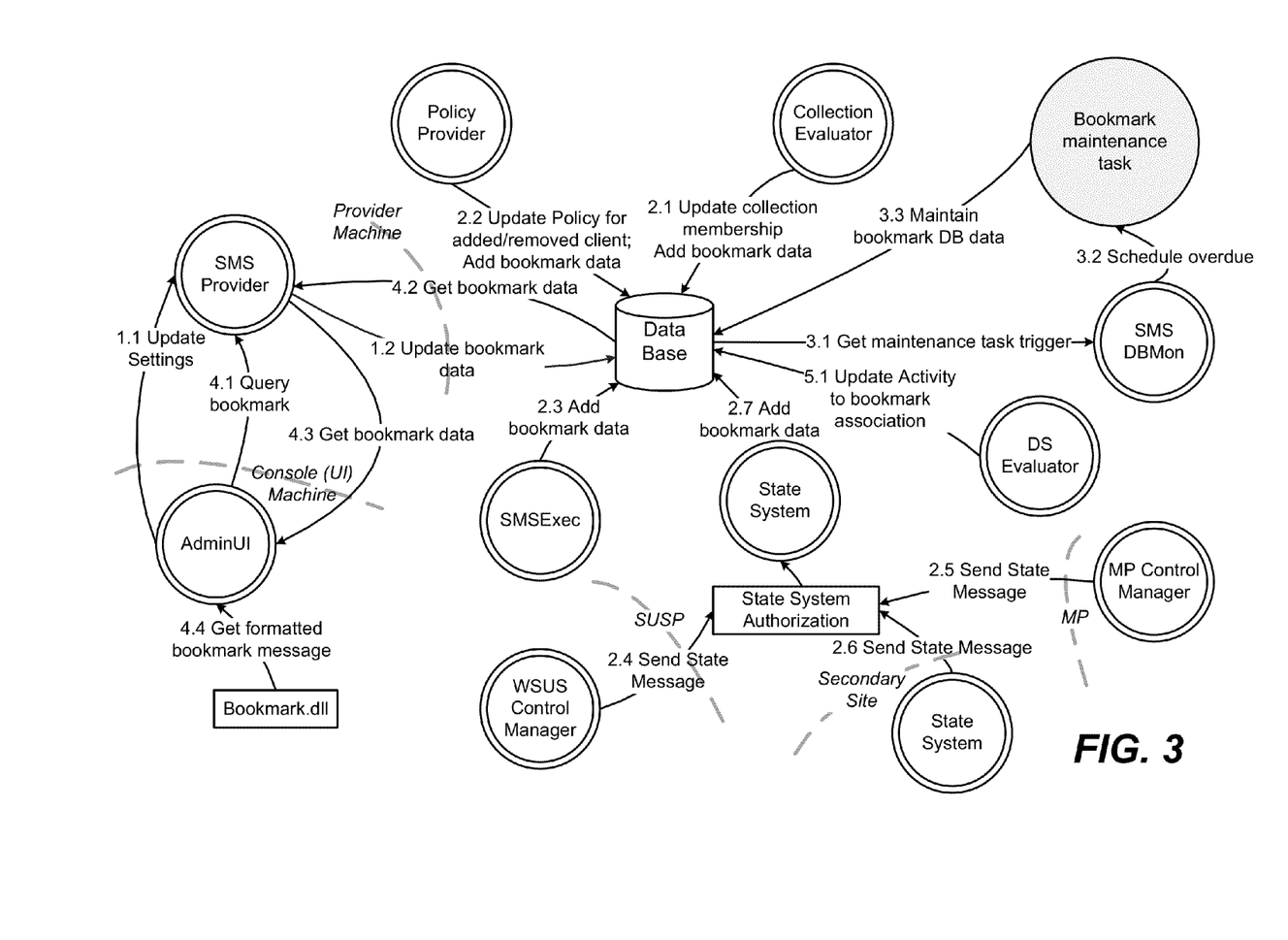
FIG. 3 is a data flow diagram representing example data flow related to a network software deployment operation, including bookmark generation.

FIG. 3 comprises a dataflow diagram summarizing some of the various operations. Note that the numbers before a decimal point indicates the entity performing the operation related to a bookmark. Thus, in FIG. 3, "1.x" indicates that a UI action adds bookmark dataflow; "2.x" indicates when site components add bookmark dataflow; "3.x" indicates maintenance task dataflow; and 4.x indicates a UI Get bookmark dataflow 5.1 also represents the delivery scope evaluator 130 updating an activity-to-bookmark association. FIG. 3 also shows some example bookmark-related maintenance tasks that may be implemented to maintain bookmark data, to maintain activity data and/or to maintain an activity fact.

Figure 4:
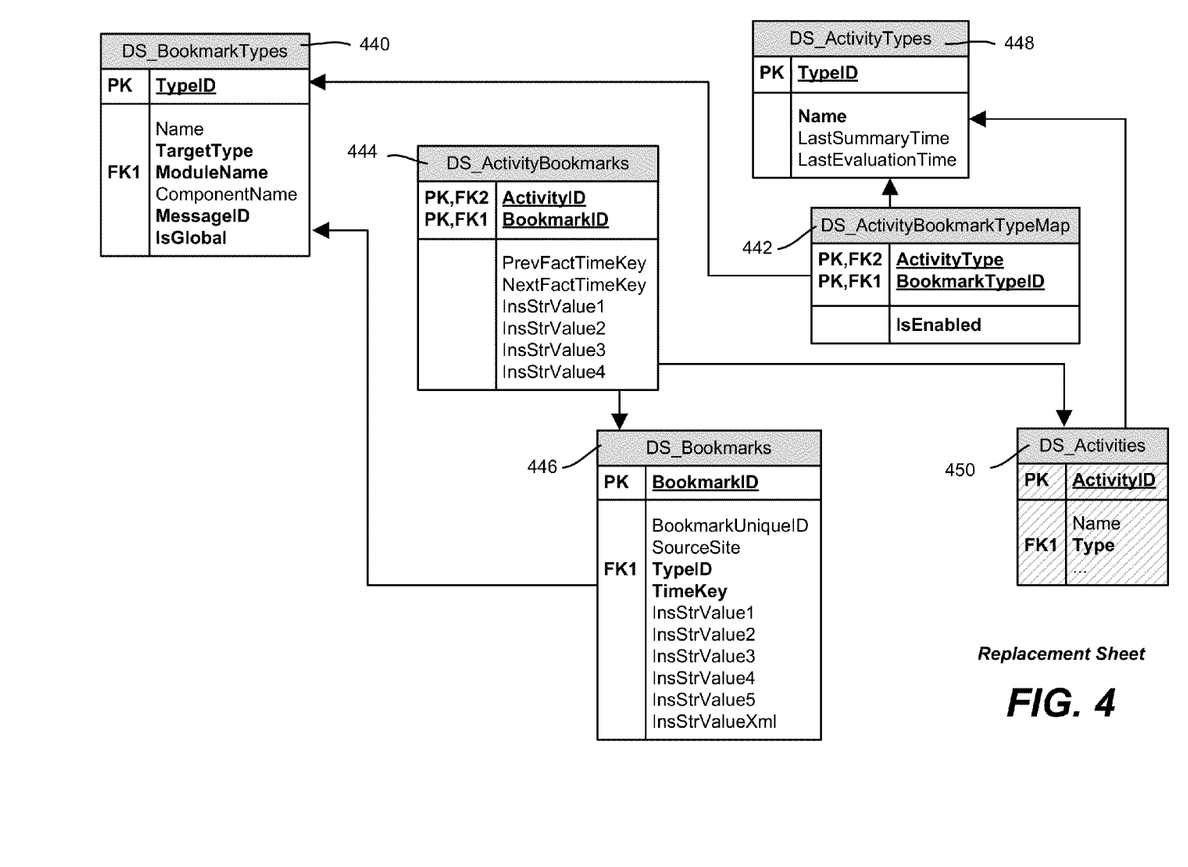
FIG. 4 is a representation of an example data architecture having an example schema for tables used with respect to bookmarks and activities in one example implementation.
Figure 5:
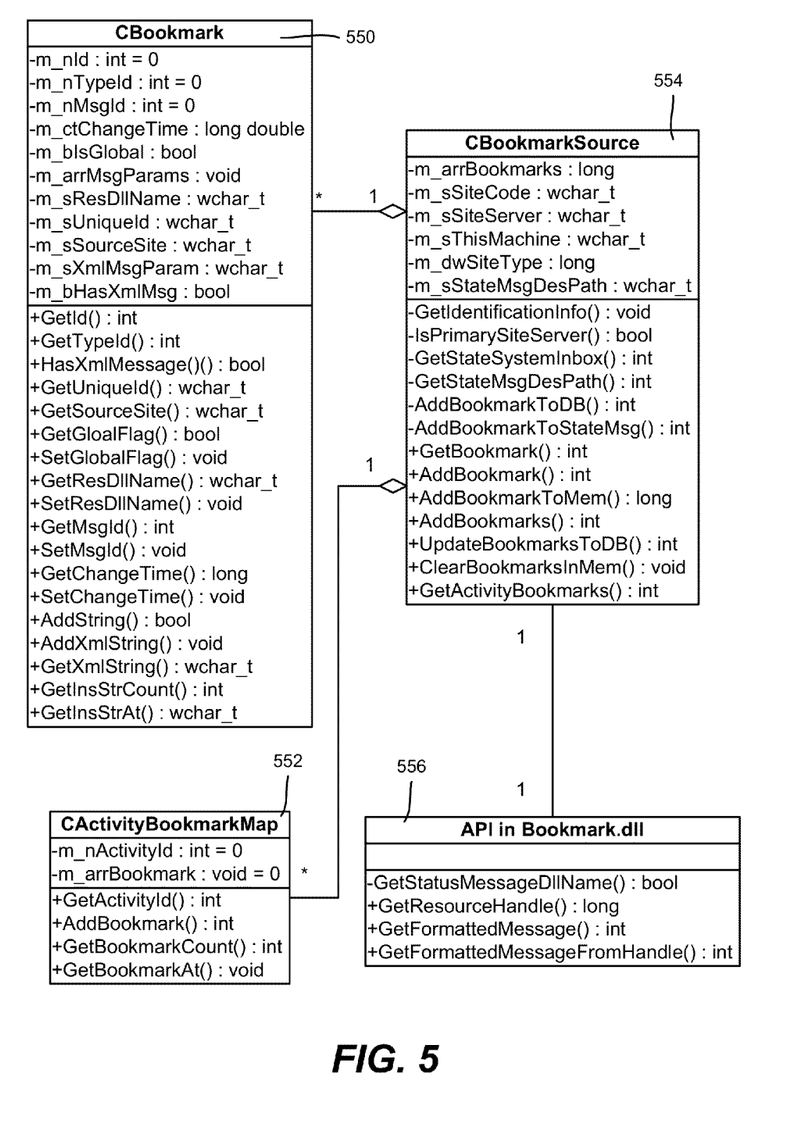
FIG. 5 is a representation of bookmark-related classes in one example implementation.

FIGS. 4 and 5, along with the following tables, provides additional details of bookmarks and activities in one example implementation.

DS_BookmarkTypes 440 is a table that holds the targets that the bookmark feature support. The data may be filled in the site server setup process.

DS_BookmarkTypes

| Column Name | Type | Length | Allow Nulls | Key | Description |
|---|---|---|---|---|---|
| TypeID | Int | 4 | No | PK | |
| Name | Varchar | 128 | Yes | | The bookmark type name |
| TargetType | Int | 4 | No | | 1-Provider 2-Component |
| ModuleName | Varchar | 128 | No | FK | SMS Server SMS Provider |
| ComponentName | Varchar | 128 | Yes | | Target component to monitor |
| MessageID | Int | 4 | No | | Bookmark message ID defined in srvmsg.mc or provmsg.mc |
| IsGlobal | bit | 1 | No | | Is this a global bookmark or an activity instance bookmark? |

DS_ActivityBookmarkTypeMap 442 is a table that holds the relationships between activities and a global bookmark, that is, which global bookmarks are related to which activity. Pre-defined activity-bookmark relationships may be created in setup.

DS_ActivityBookmarkTypeMap

| Column Name | Type | Length | Allow Nulls | Key | Description |
|---|---|---|---|---|---|
| ActivityType | Int | 4 | No | FK | Package - 1 Advertisement - 2 Deployment - 3 |
| BookmarkTypeID | Int | 4 | No | FK | |
| IsEnabled | bit | 1 | No | | |

DS_ActivityBookmarks 444 is a table that holds the bookmarks for an activity instance 450 (except global bookmark). When a bookmark is created with an existing activity ID, a bookmark instance is created in DS_Bookmarks and a relationship record is created in this table. A maintenance task may be used to maintain this table.

DS_ActivityBookmarks

| Column Name | Type | Length | Allow Nulls | Key | Description |
|---|---|---|---|---|---|
| ActivityID | Int | 4 | No | FK | |
| BookmarkID | Int | 4 | No | FK | |
| PrevFactTimeKey | Int | 4 | Yes | | Previous factor |
| NextFactTimeKey | Int | 4 | Yes | | Next factor |
| InsStrValue1 | nvarchar | 50 | Yes | | Factor description |
| InsStrValue2 | nvarchar | 50 | Yes | | |
| InsStrValue3 | nvarchar | 50 | Yes | | |
| InsStrValue4 | nvarchar | 50 | Yes | | |

DS_Bookmarks 446 is a table that holds the bookmark instances. Component behavior data are logged here. User UI action (update advertisement schedule) also may be logged into this table by the provider 104. A maintenance task may be used to maintain this table.

| | | | Allow | | |
|---|---|---|---|---|---|
| Type | | Length | Nulls | Key | Description |
| BookmarkID | Int | 4 | No | PK | |
| BookmarkUniqueID | nvarchar | 50 | No | | Bookmark unique ID |
| SourceSite | nvarchar | 3 | No | | Source site |
| TypeID | Int | 4 | No | FK | Bookmark type in DS_BookmarkType table |
| TimeKey | Int | 4 | No | | The time when the target event occurs |
| InsStrValue1 | nvarchar | 50 | Yes | | Bookmark message |
| InsStrValue2 | nvarchar | MAX | Yes | | Bookmark message |
| InsStrValue3 | nvarchar | 50 | Yes | | Bookmark message |
| InsStrValue4 | nvarchar | 50 | Yes | | Bookmark message |
| InsStrValue5 | nvarchar | 50 | Yes | | Bookmark message |
| InsStrValueXml | Xml | | Yes | | Bookmark XML formatted message |

DS_ActivityTypes 448 is a table that holds the supported activity types.

DS_ActivityTypes

| Column Name | Type | Length | Allow Nulls | Key | Description |
|---|---|---|---|---|---|
| TypeID | Int | 4 | No | PK | |
| Name | nvarchar | 50 | No | | |
| LastSummaryTime | datetime | 8 | Yes | | |
| LastEvaluationTime | datetime | 8 | Yes | | |

FIG. 5 shows bookmark related classes in one implementation. CBookmark 550 is a class in base object (baseobj), and provides a memory map for a bookmark object. CActivityBookmarkMap 552 is a relationship class in base object that describes which bookmarks are related to an activity. CBookmarkSource 554 is a class in basesrv; bookmark related operations with the database are implemented in this class. The API Bookmark.dll 556 is a separate binary for the AdminConsole. UI codes can invoke the API GetFormattedMessage( ) to get a bookmark localized message. Note that if the UI wants to retrieve a large number of messages, GetFormattedMessage( ) provided poor performance; better performance is obtained by calling GetResourceHandle( ) to get the resource handle to the message binary file, and then calling GetFormattedMessageFromHandle( ). Win32 FreeLibrary( ) is invoked to free the resource handle.

As can be seen, a bookmark captures information including change events, and operates to associate those events with one, several or all activities. Bookmarks provide an administrator with awareness of context/environment changes of given distribution, and may be used to find a potential root cause of a deployment issue.

A bookmark may be maintained with respect to changing the members of a collection, a policy change, or adding, removing updating or refreshing a distribution point with respect to a package. A bookmark also may be maintained for updating an advertisement schedule, retargeting an advertisement to a collection, or updating a schedule. Still other bookmarks record a distribution point management component change, a management and monitor components of inbox change, a database monitor component change, a status message component change, an SMSEXEC main thread change, or a management point component change, for example.

Further, bookmarks can be prioritized, may be grouped and may be marked as being positive or negative with respect to a result. The user interface may filter the set of bookmarks into a subset based on priority, based on groups and/or based on their results.

The performance history aspects are directed towards obtaining the current deployment data, such as package size, the number of clients to which deployment is needed, and so forth. During the deployment process, the performance history component collects the current data (e.g., in real time) and compares that data to the historical data.

Figure 6:
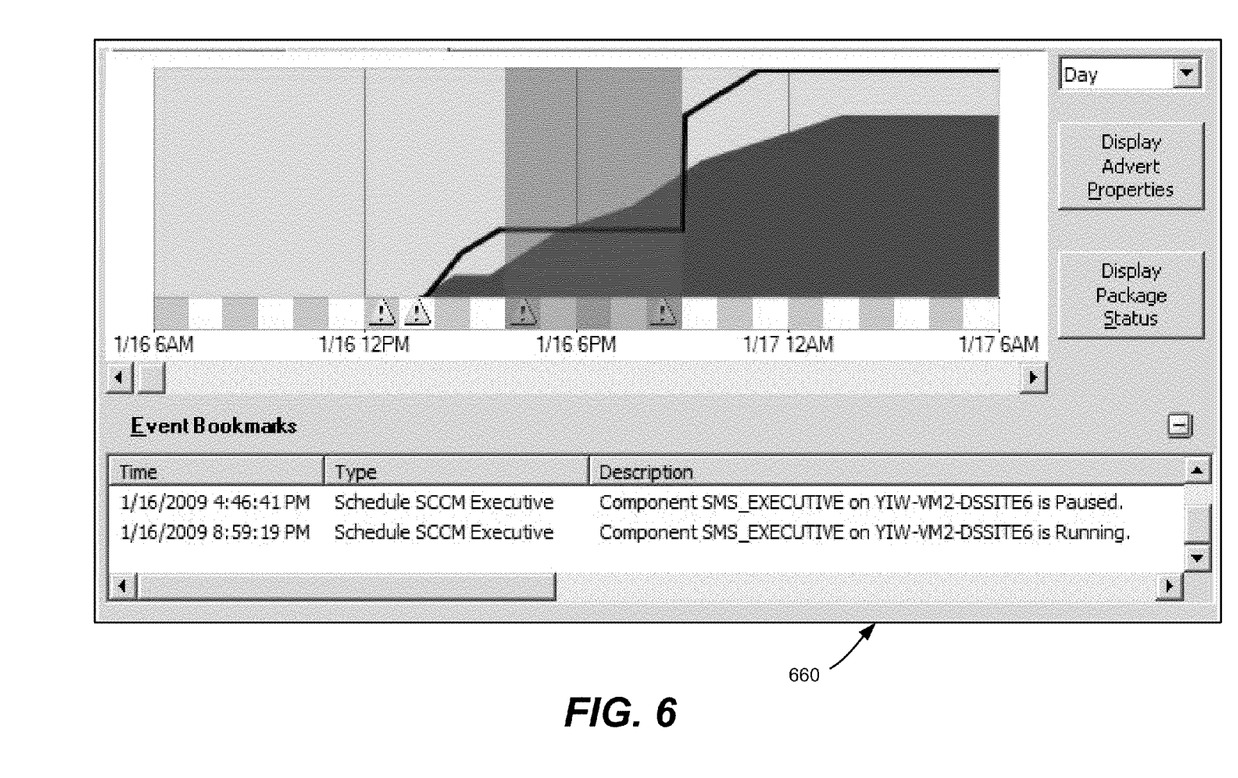
FIG. 6 is an example representation of a graph/chart generated from bookmarks of one deployment operation, and performance history data from one or more previous deployment operations.

FIG. 6 shows one way bookmarks may be used to provide an automatically generated chart 660. The curve between the light and dark-shaded areas comprises a performance history curve, and each triangle with exclamation point ("warning") corresponds to a bookmark that occurred during the deployment.

The black line is a curve representing the actual deployment progress. If this curve is in the lightly shaded area, deployment is on track, while if in the darker shaded area, something wrong has happened, suggesting troubleshooting is needed. For example, around 6:00 PM on 1/16, the deployment curve enters the darker area, and there are two bookmarks around that timestamp. The administrator may select the time range, e.g., the medium-shaded area selected by using a mouse/pointer, to view the bookmark information in this time range. For example, as can be seen in the description of the two bookmarks, the administrator finds that the SCCM executive was paused at that time, which is the root cause of the problem. When the SCCM executive was later restarted, deployment resumed normally.

Bookmarks along with performance history thus help the administrator focus on the main/significant events, troubleshoot issues with high efficiency, and/or automatically evaluate the health of the entire deployment process. Automatic computations and the like help the administrator to estimate when the current deployment will complete, as well as to evaluate the current deployment progress, such as whether it is on track or delayed relative to the history of similar past deployments.

As can be seen, with the bookmark information, an administrator does not have to check the status messages reported by the client machines and/or analyze the raw data manually, which are inefficient operations. With the performance history, the administrator has an estimate of the time usage and progress, and can easily determine whether a deployment task is on track or delayed, without relying on personal experience. Bookmarking and performance history thereby significantly assist with any needed troubleshooting.

Exemplary Operating Environment

Figure 7:
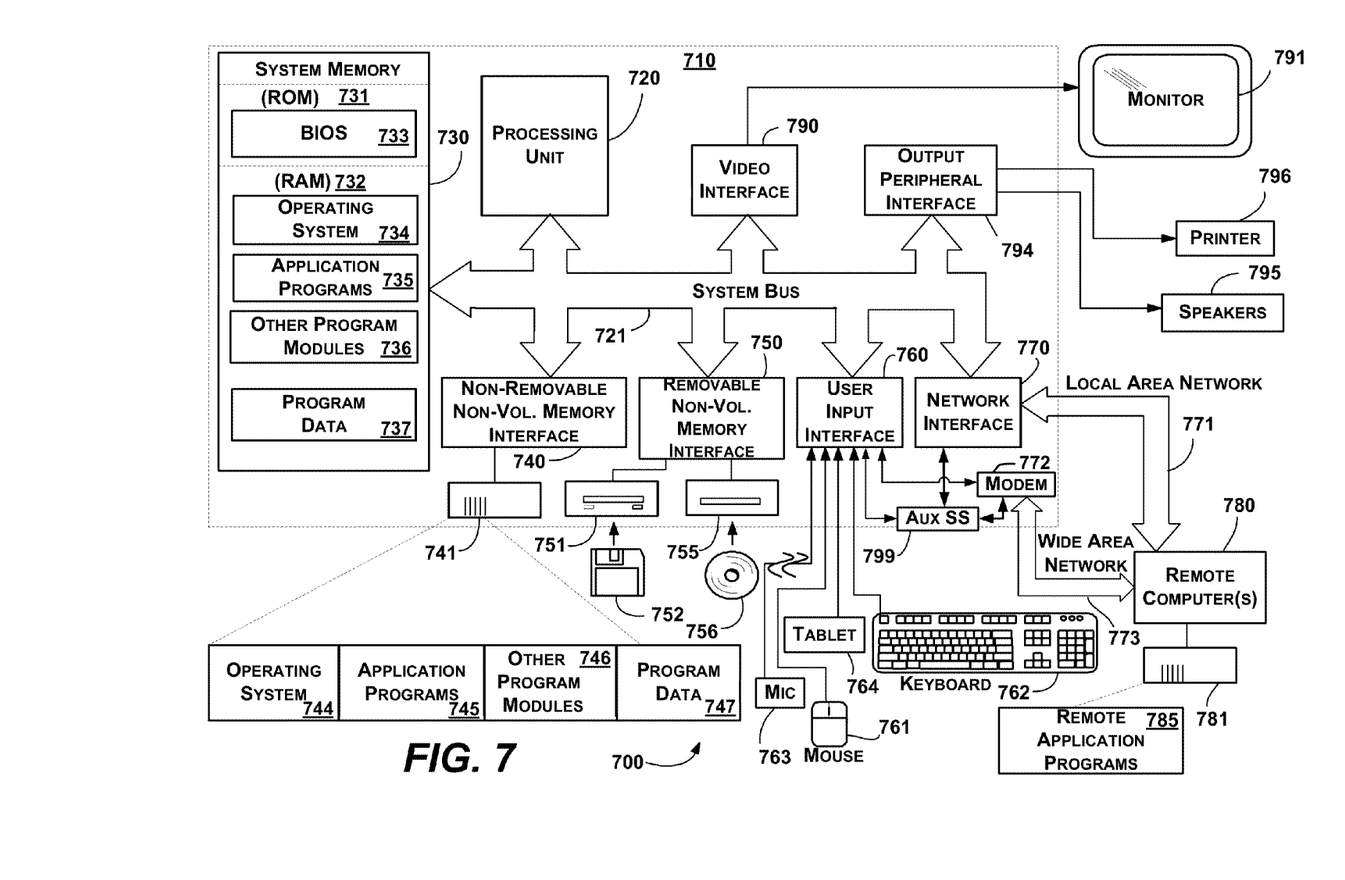
FIG. 7 shows an illustrative example of a computing environment into which various aspects of the present invention may be incorporated.

FIG. 7 illustrates an example of a suitable computing and networking environment 700 on which the examples of FIGS. 1-6 may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a system comprising:
   a data store coupled to network components that deploy network software in a network software deployment operation; and
   a set of bookmarks maintained in the data store, the set of bookmarks configured to record events and trigger information of the network software deployment operation and associate the events with one or more activities, wherein one or more bookmarks are automatically generated by at least one of one or more of the network components or by user interface interaction in response to a type of activity, the one or more bookmarks accessible via the data store for use in evaluating progress and state of the network software deployment operation, and the one or more bookmarks including at least one of a subset of bookmarks that are prioritized relative to one another, a subset of bookmarks that are grouped together, and a subset of bookmarks that are positive or negative with respect to a result.

2. The system of claim 1 wherein each of the one or more bookmarks has an associated timestamp corresponding to an event.

3. The system of claim 1 wherein at least one of the bookmarks is generated upon updating an association between an activity and a bookmark.

4. The system of claim 1 further comprising:
   at least one bookmark configured to record information regarding whether deployment to a client machine succeeded.

5. The system of claim 1 further comprising:
   at least one bookmark configured to record information regarding a maintenance task.

6. The system of claim 1 wherein the set of bookmarks includes at least one of a bookmark configured to record when a software deployment package is created, or a bookmark configured to record when a software deployment package is distributed to a distribution point.

7. The system of claim 1 wherein the set of bookmarks includes at least one of a bookmark configured to record when a distribution policy is generated or changed, or a bookmark configured to record an object change event that affects the deployment task status.

8. The system of claim 1 wherein the set of bookmarks includes a bookmark configured to record when a network component starts, stops or restarts.

9. The system of claim 1 wherein the set of bookmarks includes at least one of a bookmark configured to record when membership of a collection of network members changes, or a bookmark configured to record when a network component is added, removed, updated or refreshed.

10. The system of claim 1 further comprising:
    a performance history component configured to access performance history data corresponding to one or more previous network software deployment operations and generate a visual representation of a current deployment progress as compared to the one or more previous network software deployment operations using the one or more bookmarks that are automatically generated.

11. The system of claim 1 further comprising:
    a user interface for viewing a representation of the progress and state of the network software deployment operation with respect to a representation of performance history data.

12. In a computing environment, a method performed on at least one processor, comprising:
  generating, by a network component, a bookmark configured to perform one or more tasks related to a deployment of network software, the bookmark further configured to capture information including change events, record data associated with the change event, record time data representative of when the change event occurred during the deployment, and associate the change event with one or more activities;
  collecting the bookmark in association with other bookmarks generated with respect to the deployment to provide information that is useable in evaluating the deployment; and
  generating a visual representation indicative of progress of the deployment over time based upon the bookmark and at least one of the other bookmarks.

13. The method of claim 12 further comprising:
  accessing performance history data corresponding to one or more previous network software deployment operations; and
  using the performance history data to generate another visual representation of deployment progress over time as compared to the one or more previous network software deployment operations.

14. The method of claim 12 further comprising:
  generating a visual representation of at least one of context changes and environment changes during a network software deployment operation.

15. The method of claim 12 wherein generating the bookmark comprises at least one of determining that a network component starts, stops or restarts, determining that membership of a collection of network members changes, or determining that a network component is added, removed, updated or refreshed.

16. The method of claim 12 wherein the bookmark and the other bookmarks comprise a set, and further comprising:
  filtering the set into a subset based upon a priority associated with at least some of the bookmarks of the set, filtering the set into a subset based upon a grouping of at least some of the bookmarks of the set, or filtering the set into a subset based upon positive or negative data associated with at least some of the bookmarks of the set.

17. One or more tangible computer storage devices having computer-executable instructions, which when executed by a computer causes the computer to perform steps, comprising:
  accessing a set of bookmarks, each bookmark in the set of bookmarks configured to record data regarding a current network software deployment operation, including to associate the data recorded with an event, a time corresponding to the event, and a type of activity;
  automatically generating a visual representation indicative of progress over time of the current network software deployment operation using the set of bookmarks, wherein the visual representation further indicates whether the current network software deployment operation is on track or if troubleshooting is needed;
  accessing performance history data related to one or more previous network software deployment operations; and
  generating another visual representation indicative of previous progress of deploying other network software to client computer systems as compared to the current network software deployment operation using the set of bookmarks and the performance history data.

18. The one or more tangible computer storage devices of claim 17 having further computer-executable instructions comprising:
  displaying a representation corresponding to where, in time, at least some of the bookmarks were automatically generated in response to one or more events.

19. The one or more tangible computer storage devices of claim 17 having further computer-executable instructions comprising:
  displaying visible information about at least some of the bookmarks that are present within a selectable time range.

20. The one or more tangible computer storage devices of claim 17 having further computer-executable instructions comprising:
  filtering the set of bookmarks into at least one of a subset of bookmarks based upon a priority associated with at least some of the bookmarks of the set, filtering the set of bookmarks into a subset of bookmarks based upon a grouping of at least some of the bookmarks of the set, or filtering the set of bookmarks into a subset of bookmarks based upon positive or negative data associated with at least some of the bookmarks of the set.

* * * * *